United States Patent [19]
Schollenberger et al.

[11] 3,929,726
[45] Dec. 30, 1975

[54] COLOR STABILIZED POLYURETHANES

[75] Inventors: Charles S. Schollenberger, Hudson; Kornelius Dinbergs, Broadview Heights; Philip C. Kelley, Brecksville, all of Ohio

[73] Assignee: The B. F. Goodrich Company, Akron, Ohio

[22] Filed: Sept. 6, 1974

[21] Appl. No.: 503,801

[52] U.S. Cl. ... 260/45.85 B; 260/45.9 NC; 260/45.8
[51] Int. Cl.² ............................................. C08G 6/00
[58] Field of Search ....... 260/45.9 NC, 45.8, 2.5 BB

[56] References Cited
UNITED STATES PATENTS

| | | | |
|---|---|---|---|
| 3,149,998 | 9/1964 | Thurmaier | 260/45.9 |
| 3,485,778 | 12/1969 | Oertel et al. | 260/45.9 |
| 3,538,046 | 11/1970 | Oertel et al. | 260/45.9 |
| 3,773,722 | 11/1973 | Dexter | 260/45.9 |

*Primary Examiner*—V. P. Hoke
*Attorney, Agent, or Firm*—J. Hughes Powell, Jr.

[57] ABSTRACT

Polyurethanes exposed to degradative atmospheric conditions, particularly ultraviolet light, have improved resistance to such degradation when the polyurethanes contain small amounts of organic hydrazide. Further improvements are also noted when the organic hydrazides are used in conjunction with phenolic stabilizers and/or ultraviolet absorbers.

4 Claims, No Drawings

COLOR STABILIZED POLYURETHANES

BACKGROUND OF THE INVENTION

Solid polyurethanes, both thermoplastic and elastomeric, find many applications because of their excellent physical properties including abrasion resistance. Such applications include, for example, films and coatings on fabric, metal, as films per se, and the like where they are often exposed to degradative effects of the atmosphere including ultraviolet light. For such applications where the polyurethane surface is exposed, polyurethane compositions having improved resistance to atmospheric degradation, particularly ultraviolet, are desirable.

SUMMARY OF THE INVENTION

Polyurethanes especially in film form, when exposed to the degradative atmosphere, particularly ultraviolet light, have resistance to such degradation when the polyurethane contains small amounts of an organic hydrazide. Such materials are particularly effective in polyurethanes prepared from aromatic polyisocyanates. Further, improvement in resistance to ultraviolet degradation is observed when phenolic stabilizers and/or ultraviolet absorbers are used in conjunction with the organic hydrazide.

DETAILED DESCRIPTION

The polyurethanes are readily prepared from a variety of compounds having terminal functional groups reactive with organic diisocyanates. Normally used are hydroxyl-terminated compounds. The hydroxyl-terminated compounds or macroglycols usually have molecular weights greater than about 300 to 400. A great variety of such macroglycols have been prepared and proposed for commercial applications. The most commonly used macroglycols are hydroxyl-terminated polyesters, polyethers, polylactones and polybutadienes. In the preparation of one type of elastomeric film and sheet material such macroglycols, alone or in admixture, having molecular weights greater than about 400, and difunctional chain extenders such as glycols, are reacted with the organic diisocyanate. Useful materials are obtained by reacting the organic diisocyanate with a mixture of a macroglycol and a low molecular weight difunctional chain extender such as an alkylene glycol or ether glycol, a cycloaliphatic glycol, or an aromatic-aliphatic glycol; or the socalled prepolymer technique may be used where an excess of organic diisocyanate is first reacted with the macroglycol and then the low molecular weight difunctional chain extender added, normally in amounts equivalent to react with substantially all of the free isocyanate groups.

The hydroxyl polyester macroglycols are linear hydroxyl-terminated polyesters having molecular weights between about 500 and 4000 and acid numbers usually less than about 10. The polyesters utilized include those prepared by the polyesterification of aliphatic dicarboxylic acids including for example, adipic, succinic, pimelic, suberic, azelaic, sebacic and the like or their anhydrides. Aromatic dicarboxylic acids may also be used, or mixtures of aliphatic and aromatic dicarboxylic acids. Useful acids include aliphatic dicarboxylic acids of the formula HOOC—R—COOH where R is an alkylene radical containing 2 to 8 carbon atoms. The phthalic acids are also useful. The glycols used in the preparation of the polyesters by reaction with the dicarboxylic acids are aliphatic glycols containing between 2 and 10 carbon atoms such as ethylene glycol, propanediol, butanediol, hexamethylene glycol, octamethylene glycol, 2-ethyl-1,6-hexanediol, neopentyl glycol and the like. Preparation of the specific polyesterurethanes from polyesters are described in U.S. Pat. No. 2,871,218 for example. Polyesteramides also are contemplated, usually by substitution of a diamine or amino alcohol for at least part of the glycol.

Poly(epsilon-caprolactone)diol macroglycols are the polyester reaction products of epsilon-caprolactones whose polymerization has been initiated by bifunctional compounds having two active hydrogen sites which are capable of opening the lactone ring and initiating polymerization of the lactone. These bifunctional materials may be represented by the formula HX—R—XH wherein R is an organic radical which can be aliphatic, cycloaliphatic, aromatic or heterocyclic and X is O, NH and NR where R is a hydrocarbon radical which can be alkyl, aryl, aralkyl and cycloalkyl. Such materials include diols, diamines and aminoalcohols preferably. Useful diols include alkylene glycols wherein the alkylene group contains 2 to 10 carbon atoms for example, ethylene glycol, 1,2-propane diol, 1,4-butanediol, hexamethylene glycol and the like. Ethylene glycol provides excellent polyesters.

The lactones preferred for preparing the polyesters are epsilon-caprolactones having the general formula

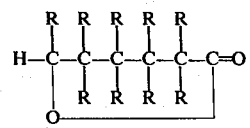

wherein at least 6 of the R's are hydrogen and the remainder are hydrogen or alkyl groups containing 1 to 10 carbon atoms, preferably methyl. Mixtures of lactones may be employed to form the polyesters as epsilon-caprolactone and trimethylepsilon-caprolactone, γ-methyl-epsilon-caprolactone, β-methylepsilon-caprolactone, dimethyl-epsilon-caprolactone and the like. The lactones are polymerized readily by heating with the bifunctional reactant to a temperature of about 100° to about 200°C. Catalysts may be employed if desired. Particularly preferred are poly(epsilon-caprolactone)diols having molecular weights in the range of about 500 to about 5000.

The hydroxyl(polyalkylene oxide), or polyether, macroglycols preferably are essentially linear hydroxyl-terminated compounds having ether linkages as the major hetero-atom linkage joining carbon atoms. The molecular weights may vary between about 500 and 4000. The hydroxyl(polyalkylene oxide)s found useful include hydroxyl poly(methylene oxide)s such as hydroxyl poly(tetramethylene oxide), hydroxyl poly(trimethylene oxide), hydroxyl poly(hexamethylene oxide), hydroxyl poly(ethylene oxide) and the like of the formula HO[(CH$_2$)$_n$O]$_x$H wherein $n$ is a number from 2 to 6 and x is an integer, and alkyl substituted types such as hydroxyl poly(1,2-propylene oxide). Preparation of polyurethanes from such polyethers is described in U.S. Pat. No. 2,899,411 for example.

If low molecular weight glycols are used as chain extender with the macroglycols and the organic diisocyanate, these normally are aliphatic glycols or ether glycols containing 2 to 10 carbon atoms. Typical glycols which have been employed include ethylene glycol, propylene glycol, 1,4-butanediol, hexanediol, 2-ethyl-1,6-hexanediol, neopentyl glycol and the like. Cycloaliphatic glycols such as cyclohexanedimethanol, and aromatic-aliphatic glycols such as bis-1,4($\beta$-hydroxyethoxy) benzene, may also be employed.

The amount of glycol chain extender used with the macroglycol and the diisocyanate may vary from about 0.1 to 12 mols per mol of macroglycol. Excellent polyurethanes are obtained with a molar ratio of one mol of macroglycol and 1 to 5 mols of the small chain extender glycol. Substituted glycols also may be used.

The organic diisocyanates which are reacted with the macroglycols will include, for example, both aliphatic and aromatic diisocyanates. Such aliphatic diisocyanates include for example, hexamethylene diisocyanate, methylene-bis(4-cyclohexyl isocyanate), isophorone diisocyanate, etc. The aromatic diisocyanates include naphthalene-1,5-diisocyanate, diphenyl methane-4,4'-diisocyanate, tolylene diisocyanate, p-phenylene diisocyanate, dichlorodiphenyl methane diisocyanate, dimethyl diphenyl methane diisocyanate, bibenzyl diisocyanate, diphenyl ether diisocyanates, bitolylene diisocyanates and the like, for example, diisocyanates of the formula

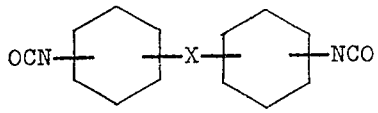

wherein X may be a valence bond, an alkylene radical containing 1 to 5 carbon atoms, NR (where R is an alkyl radical), oxygen, sulfur, sulfoxide, sulfone and the like.

About equimolar ratios of diisocyanate and diols may be used. When a small glycol chain extender is also used, the ratio of reactants employed may be varied from about 1.5 to 13 mols of organic diisocyanate per mol of macroglycol with 0.5 to 12 mols of the glycol. The amount of organic diisocyanate used is dependent on the total amount of glycol chain extender and macroglycol and normally is a molar amount essentially equivalent to the total of these latter two reactants so that there are essentially no free unreacted isocyanate groups remaining in the polymer. Excellent polyurethanes have been obtained when a molar ratio of one mol of macroglycol of molecular weight about 800 to 2500, 1 to 3 mols of glycol, and 2 to 4 mols of the aromatic diisocyanate are caused to react. While essentially equimolar amounts of isocyanate and active hydrogen groups are preferred, it will be understood that an excess of any reactant, preferably less than 10 percent, as 5 percent, of excess organic diisocyanate can be used, although larger amounts of diisocyanate can, of course, be used in forming prepolymers. These, of course, have to be kept free of moisture until further reaction with the chain extender component is desired.

Other polyurethane materials that are well known and prepared in a variety of ways as is described in the patent literature may be used. For example, hydroxyl-terminated polyesters, polyesteramides, polyalkylene ether glycols and the like of molecular weights from about 800 to 3000 or higher are reacted with organic isocyanates, generally with an excess of the diisocyanate. The resulting polyurethane elastomers may be cured or vulcanized by adding additional organic diisocyanate whereas only a slight excess of isocyanate is used to make the polyurethane; or if a substantial excess of organic diisocyanate is used in making the polyurethane, then the isocyanate-terminated polyurethane is mixed or treated or exposed to such amounts of polyfunctional additives such as water, diamines, glycols, and the like that will result in its curing or vulcanization. The excess diisocyanate present or added is in amounts from about 1 to 25 percent, preferably 3 to 15 weight parts per 100 weight parts of polyurethane. Regardless of the source of the polyurethane, the advantages of this invention are realized.

Organic hydrazides in general have been found to be useful as stabilizers for these polyurethanes. These hydrazides have the general formula

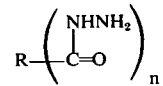

where $n = 1$ to 4 and R = a mono-, di-, tri- or tetravalent organic radical. R may represent a great variety of organic radicals including for example, alkyl of the general formula $C_nH_{2n+1}$ wherein $n$ is from about 1 to 24. R may also be more preferably an aromatic or cyclic radical containing 1 to 4 cyclic rings such as those derived from benzene, naphthalene, anthracene and the like. Organic hydrazides and the like useful include for example, benzoic acid hydrazide, p-hydroxybenzoic acid hydrazide, ortho-, meta- and terephthalic acid hydrazides, butyric acid hydrazide, lauric acid hydrazide, $\beta$-naphthoic acid hydrazide, 3(4-hydroxy-3,5-di-t-butylphenyl)propionic acid hydrazide, 2-hydroxy-3-t-butyl-5-methylphenyl acetic acid hydrazide, isonicotinic acid hydrazide.

The amount used may be varied quite widely, for example from about 0.1 to about 3 to 5 weight parts organic hydrazide per 100 weight parts of polyurethane.

Other materials useful as stabilizers which were inferior to the foregoing listed organic hydrazides include, for example, acetoacetanilide, N-benzyl morpholine, and ethyl carbanilate.

These polyurethanes can also be mixed and compounded with standard compounding ingredients known to those skilled in the art including, for example, lubricants, fillers, colorants, plasticizers, pigments, processing aids, plasticizers, and the like, as well as other stabilizers and antioxidants.

Useful combinations of the stabilizers of this invention in conjunction with other generally hydroxyl-containing aryl ultraviolet absorbers and antioxidants provide outstanding resistance in some of the polymers. Typical of such materials includes benzophenones including 2,4-dihydroxy-benzophenone, 2,2'-dihydroxy-4,4'-dimethoxy benzophenone, 2-hydroxy-4-methoxybenzophenone, 2-hydroxy-4-n-heptoxy-benzophenone, 4-dodecyloxy-2-hydroxy-benzophenone, 5-chloro-2-hydroxy-benzophenone; substituted isocyanurates as hydroxyl phenyl substituted isocyanurates including tris-(3,5-di-t-butyl-4-hydroxybenzyl)isocyanurate and tris[3-(3,5-di-t-butyl-4-hydroxyphenyl)propionyloxyethyl]isocyanurate; benzotriazoles including 2(2'-hydroxy-5'-methylphenyl) benzotriazole, 2-(3',5'-di-tert-butyl-2'-hydroxyphenyl)-5-chlorobenzotriazole and 2[2'-hydroxy-3',5'-di-(t-amyl)-phenyl]benzotriazole; benzylidene malonates; substituted acrylonitriles including ethyl-2-cyano-3,3-diphenyl acrylate; diethyl-3-acetyl-4-hydroxybenzyl phosphonate; pentaerythritol tetra-β-(4-hydroxy-3,5-di-t-butyl-phenyl)-propionate; substituted triazines as hexahydro-1,3,5-tris-β-(3,5-di-t-butyl-4-hydroxyphenyl)propionyl-s-triazine and 2,4,6-tris(3,5-di-t-butyl-4-hydroxybenzylthio)-s-triazine, and the like in amounts of 0.01 to 3 to 5 weight parts.

To demonstrate the effectiveness of the organic hydrazide in the practice of this invention a 15 percent solution in tetrahydrofuran was made of a polyesterurethane prepared by reacting one mol of a polytetramethylene adipate polyester of 1050 molecular weight, 1.0 mol of butanediol-1,4 and 2 mols of diphenylmethane diisocyanate. Each of the organic hydrazides tested was added to the polyurethane cement in an amount of one part per 100 part based on the polyurethane. The resulting cement was spread on glass and dried at room temperatures to provide films about 3 mil thick. The film samples were removed from the glass and suspended with both sides exposed in 13 inches diameter aluminum cylinder containing four circular (12 inches diameter) fluorescent black light tubes. The screening used the highest light level which provides a temperature of 85°–90°C. in the sample chamber. The samples were exposed for 24 hours and observed each hour for the first 8 hours, then every 2 hours thereafter. Stabilizer effectiveness is judged by the time lapsed before development of yellow color. In Table I below appears the organic hydrazide employed with the effective life to first yellow indicated along with a control.

TABLE II

| Stabilizers (phr) | Effective Life In High Intensity UV Source |
|---|---|
| 1 BAH + 1 Irg. 1010 + 1 Tin.328 | 9.5 hour |
| 0.5 BAH + 0.5 Irg. 1010 + 1 Tin. 328 | 10.5 hour |
| 1 BAH + 1 Tin. 328 | 5.0 hour |
| 1 BAH + 1 Irg. 1010 | 6.2 hour |
| 2 BAH + 1 Tin. 328 | 7.0 hour |
| 1 LAH + 1 Irg. 1010 + Tin.328 | 7.0 hour |
| 1 p-HBAH + 1 Tin. 328 | 4.0 hour |
| 1 p-HBAH + 1 Irg. 1010 + 1 Tin.328 | 4.0 hour |

Films containing a three part stabilizer system with BAH in combination with Irganox 1010 and Tinuvin 328 can be soaked in water for at least 16 hours at room temperature (20°C.) without significantly reducing their effectiveness in spite of the fact that BAH is water soluble.

(1) — pentaerythritol-tetra-β-(4-hydroxy-3,5-di-t-butyl phenyl) propionate (2) — 2[2'-hydroxy-3',5'-di-(t-amyl)phenyl] benzotriazole

EXAMPLE III

Physical properties of polymers containing the hydrazides of this invention were also determined and then measured during aging in the dry Atlas carbon arc Weatherometer, following changes in physical properties as measured on an Instron tensile tester using 46 × 15 × 6.4 mm oval ring test samples cut from exposed 25 mil sheet. This accelerated aging simulates extended outdoor exposure as is understood by those skilled in the art. In the data table below will be found the parts of benzoic acid hydrazide, phenolic compound, and ultraviolet absorber used with original tensile and percent retained during exposure by hours.

TABLE I

| Run | Name | Structure | Effective Life (1 phr) |
|---|---|---|---|
| 1 | Benzoic acid hydrazide | $C_6H_5\text{-CO-NHNH}_2$ | 2.1 hours |
| 2 | p-Hydroxybenzoic acid hydrazide | $HO\text{-}C_6H_4\text{-CONHNH}_2$ | 1.4 hours |
| 3 | Butyric acid hydrazide | $n\text{-}C_4H_9\text{-CO-NHNH}_2$ | 1.1 hour |
| 4 | Lauric acid hydrazide | $n\text{-}C_{12}H_{25}\text{-CO-NHNH}_2$ | 1.0 hour |
| 5 | β-Naphthoic acid hydrazide | (2-naphthyl)-CO-NHNH$_2$ | 1.0 hour |
| 6 | Control | | 0.2 hour |

EXAMPLE II

In this Example three of the stabilizers of Example I, the benzoic acid hydrazide (BAH), the lauric acid hydrazide and the p-hydroxybenzoic acid hydrazide (p-HBAH) were tested in conjunction with Irganox 1010[1] and Tinuvin 328[2] in the amounts indicated in the table below and with the improved results shown.

TABLE III

| Hours — exposure* | 0 original value | 4 % original | 16 value retained | 44 | 88 | 176 | 308 | 440 |
|---|---|---|---|---|---|---|---|---|
| 1 part BAH Tensile strength, psi | 3147 | 97 | 100 | 88 | 58 | 44 | 41 | — |

TABLE III-continued

| Hours — exposure* | 0 original value | 4 % original | 16 value retained | 44 | 88 | 176 | 308 | 440 |
|---|---|---|---|---|---|---|---|---|
| Elongation, % | 516 | 96 | 99 | 86 | 71 | 61 | 55 | — |
| 300% Modulus, psi | 1308 | 105 | 108 | 118 | 112 | 92 | — | — |
| 1 part BAH + 1 part Irganox 1010 + 1 part Tinuvin 328 | | | | | | | | |
| Tensile strength, psi | 3046 | — | — | 108 | 90 | 75 | 65 | 63 |
| Elongation, % | 505 | — | — | 106 | 93 | 88 | 84 | 83 |
| 300% Modulus, psi | 1290 | — | — | 105 | 111 | 110 | 105 | 106 |
| Control | | | | | | | | |
| Tensile strength, psi | 3637 | 89 | 65 | 55 | 48 | — | — | — |
| Elongation, % | 496 | 86 | 70 | 62 | 54 | — | — | — |
| 300% Modulus, psi | 1428 | 121 | 136 | 139 | — | — | — | — |

*in dry, carbon arc weatherometer (Atlas Electric Devices Co., Chicago, Ill.)

We claim:

1. A stabilized polyurethane containing about 0.1 to about 5 weight parts of benzoic acid hydrazide per 100 weight parts of polyurethane.

2. A polyurethane of claim 1 containing about 0.01 to about 5 weight parts per 100 weight parts of polyurethane of pentaerythritol-$\beta$-(4-hydroxy-3,5-di-t-butylphenyl)propionate or 2[2'-hydroxy-3',5'-di(t-amyl)-phenyl]benzotriazole.

3. A polyurethane compound of claim 2 wherein the polyurethane is a poly(esterurethane) or poly(etherurethane).

4. A polyurethane compound of claim 2 wherein the polyurethane is an elastomeric polyurethane containing aromatic groups derived from aromatic diisocyanates.

* * * * *